United States Patent [19]

Medlock

[11] Patent Number: 5,446,591

[45] Date of Patent: Aug. 29, 1995

[54] LENS MOUNTING FOR USE WITH LIQUID LENS ELEMENTS

[75] Inventor: Kevin Medlock, Oakland, Calif.

[73] Assignee: Lockheed Missiles & Space Co., Inc., Sunnyvale, Calif.

[21] Appl. No.: 14,596

[22] Filed: Feb. 8, 1993

[51] Int. Cl.[6] .................. G02B 1/06; G02B 7/02
[52] U.S. Cl. ...................... 359/666; 359/808; 359/830; 359/665
[58] Field of Search ............ 359/665, 808, 819, 830, 359/666

[56] References Cited

U.S. PATENT DOCUMENTS

| | | | |
|---|---|---|---|
| 2,836,101 | 5/1958 | Swart | 359/666 |
| 4,444,471 | 4/1984 | Ford, Jr. et al. | 359/666 |
| 4,614,403 | 9/1986 | Kersten et al. | 359/830 |
| 4,890,903 | 1/1990 | Treisman et al. | 359/666 |
| 4,958,919 | 9/1990 | Sigler | 350/418 |
| 5,210,658 | 5/1993 | Foster | 359/894 |

FOREIGN PATENT DOCUMENTS

| | | | |
|---|---|---|---|
| 0218352 | 11/1958 | Australia | 359/666 |
| 0018919 | of 1892 | United Kingdom | 359/665 |

Primary Examiner—Scott J. Sugarman
Assistant Examiner—Evelyn A. Lester
Attorney, Agent, or Firm—John J. Morrissey

[57] ABSTRACT

In a lens assembly for a telescope objective that comprises liquid lens elements contained between adjacent glass lens elements, each glass lens element is adhesively bonded to an interior surface of a corresponding cylindrical mounting ring by a sealant that is impervious to the liquid lens elements. The sealant is a proprietary fluorosilicone compound marketed as "DOW CORNING X5-8738". The cylindrical mounting rings (with the corresponding glass lens elements bonded thereto) are coaxially aligned so that planar end surfaces of adjacent mounting rings adjoin each other. Compressible O-rings made of Viton® are received in annular grooves formed on one end surface of each pair of adjoining end surfaces of adjacent mounting rings. Adjacent mounting rings are secured to each other to provide three-point mounting contact between adjacent mounting rings so as to obtain precise axial alignment of the glass lens elements. Compression of the O-rings between adjacent mounting rings produces liquid-tight gaps between adjacent glass lens elements. Liquid is introduced into the gaps between adjacent glass lens elements to form the liquid lens elements.

34 Claims, 4 Drawing Sheets

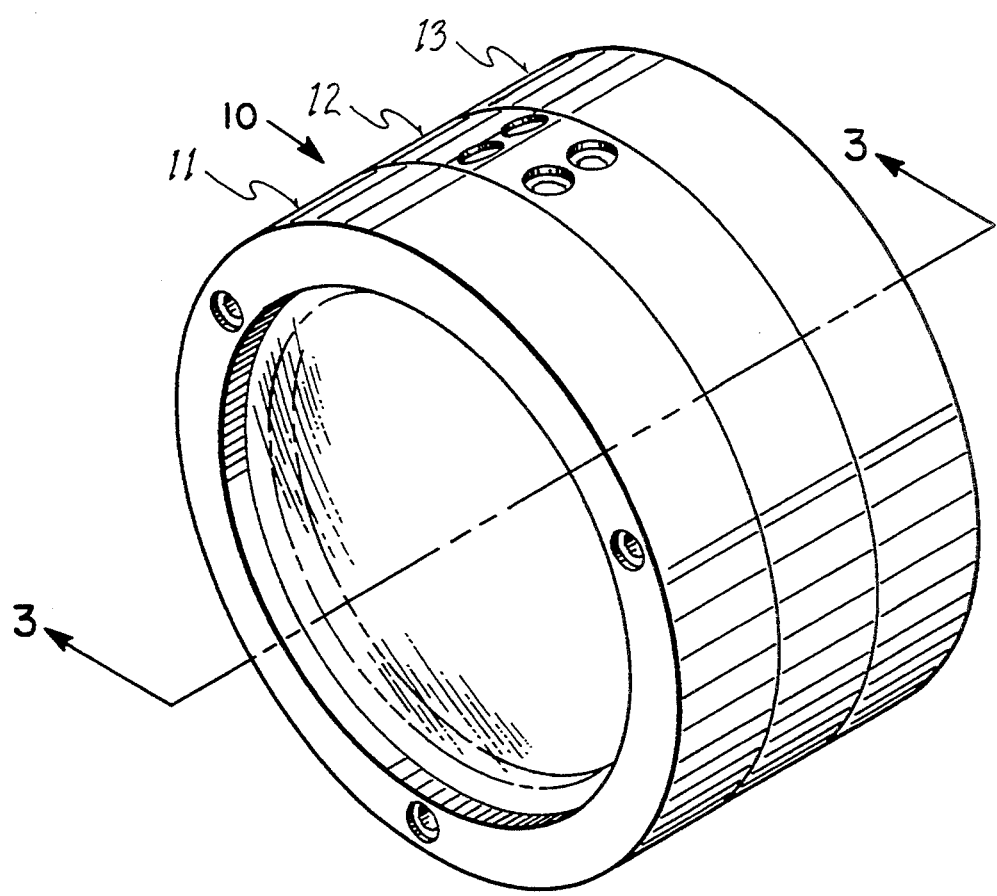
FIG_1

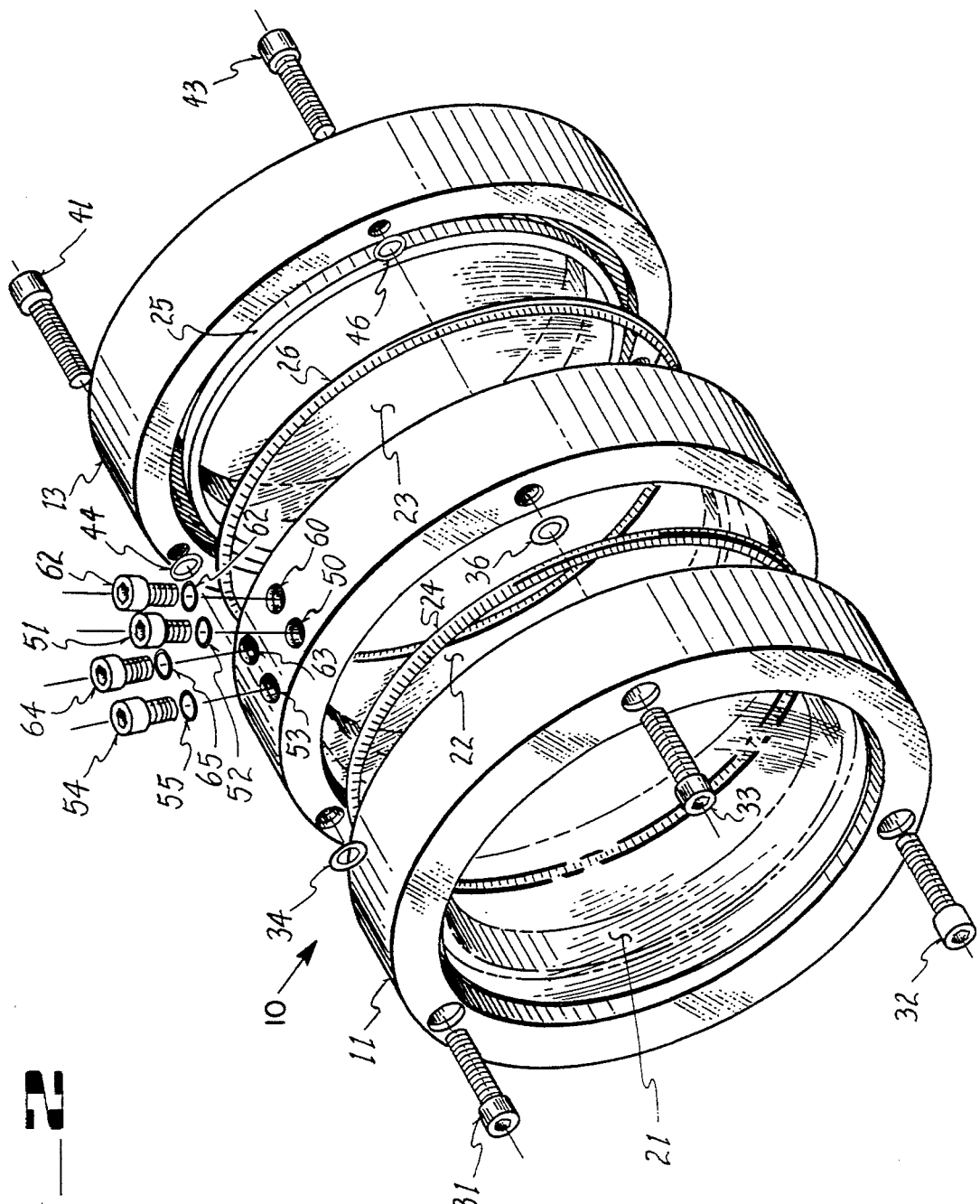
FIG_2

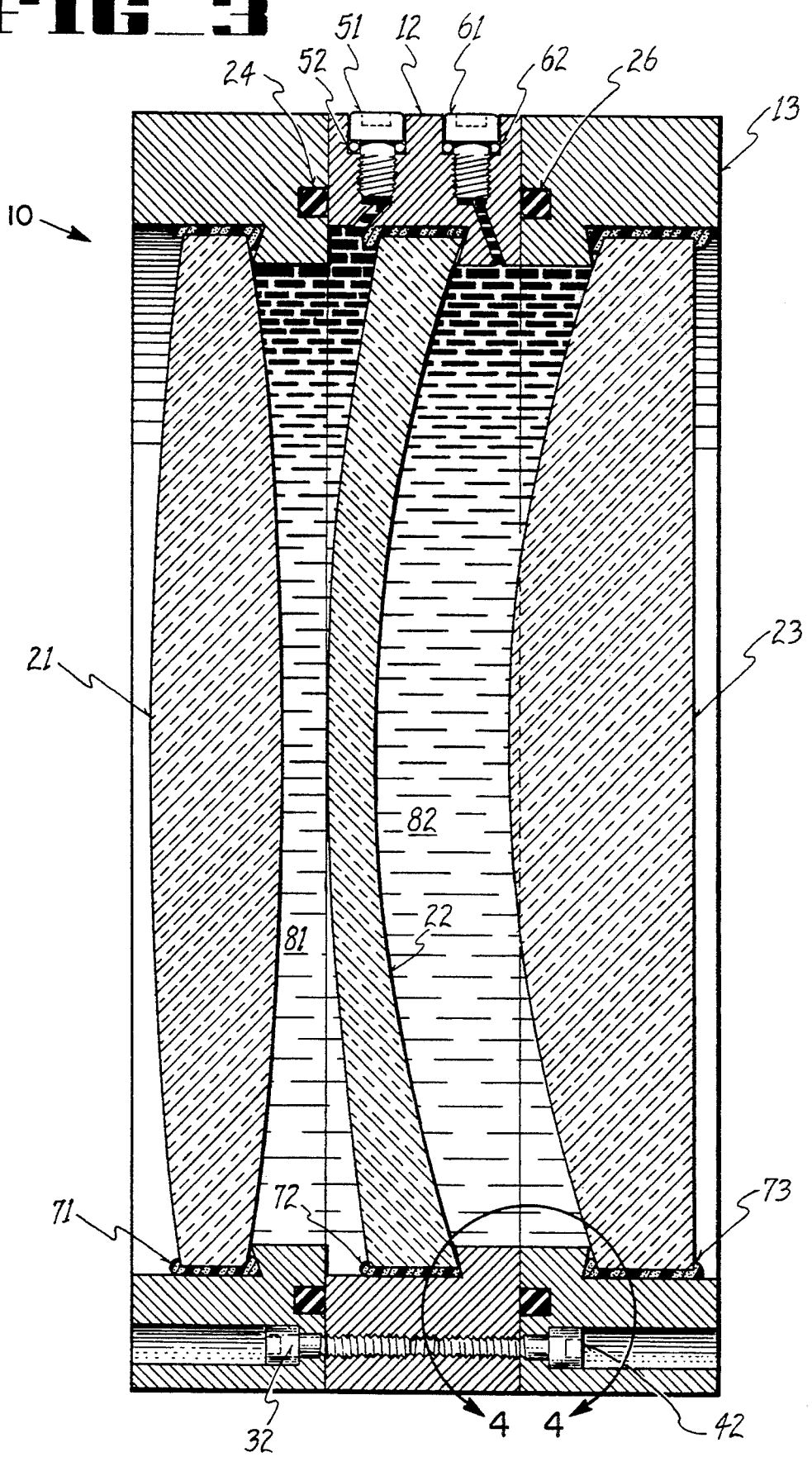
FIG_3

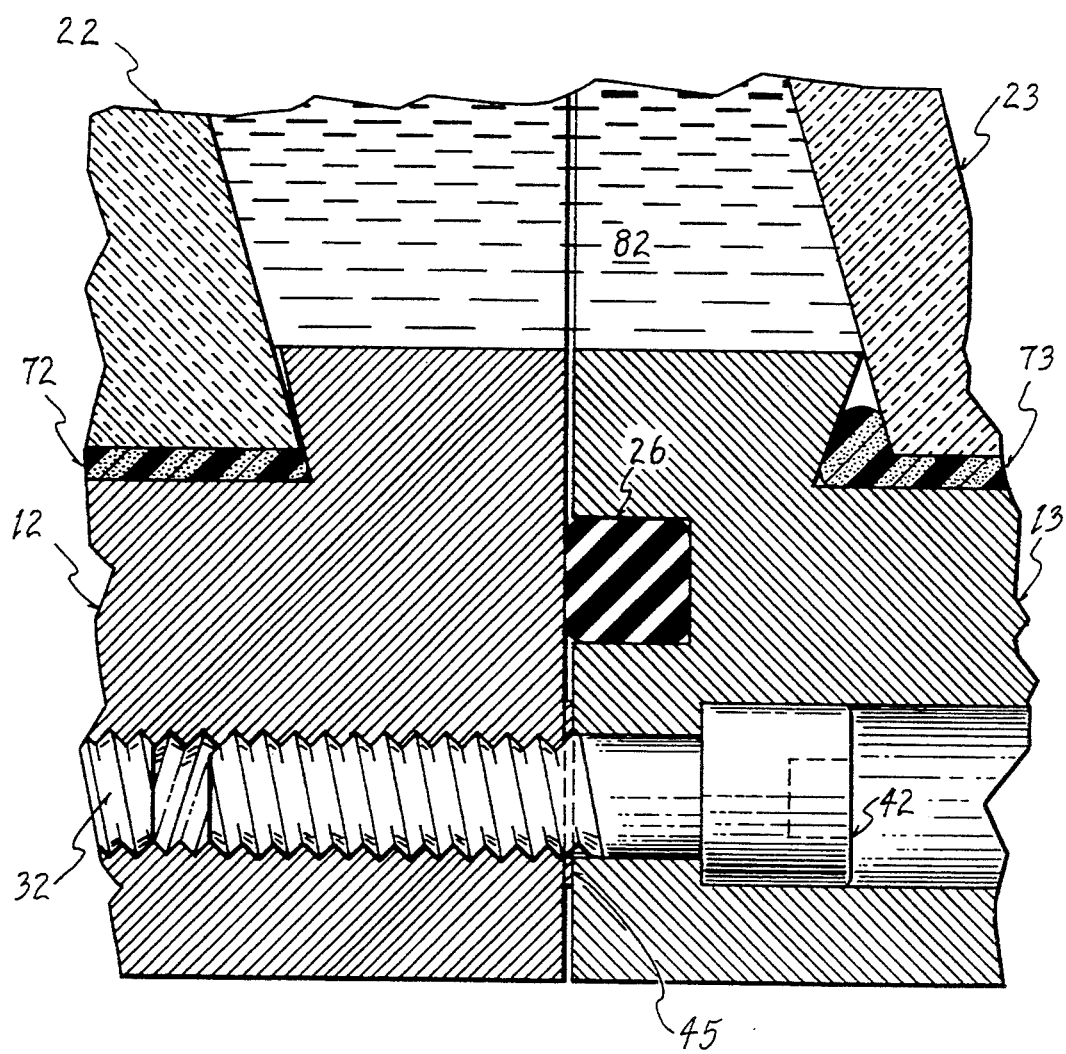
FIG_4

LENS MOUNTING FOR USE WITH LIQUID LENS ELEMENTS

TECHNICAL FIELD

This invention relates generally to lens mountings for optical systems that comprise liquid lens elements, and more particularly to a technique for mounting a telescope objective that comprises liquid lens elements contained between adjacent glass lens elements.

BACKGROUND ART

A technique was disclosed in U.S. Pat. No. 4,958,919 to R. D. Sigler for designing lens systems with reduced secondary spectrum using liquid refractive elements in combination with rigid (e.g., glass, plastic or crystal) refractive elements. Lens elements consisting of certain abnormally dispersive liquids can be used in combination with lens elements made of certain ordinary (i.e., relatively inexpensive) optical glasses of normal dispersion to achieve reduced secondary spectrum. In manufacturing optical systems, it is generally more economical to use liquid lens elements of abnormal dispersion instead of exotic glass lens elements of abnormal dispersion.

In fabricating a lens system in which a liquid lens element is to be confined within a gap between two glass lens elements, the glass lens elements must be mounted so as to seal the liquid lens element within the gap. In co-pending patent application Ser. No. 07/941,299 by D. F. Leary, filed on Sep. 4, 1992, a proprietary fluorosilicone compound marketed by Dow Corning Corporation of Midland, Mich. under the trade designation "DOW CORNING X5-8738" was disclosed as being particularly advantageous for use as an adhesive sealant in fabricating lens systems comprising liquid lens elements. The "DOW CORNING X5-8738" compound has been found to form a seal that remains leak-tight when exposed to silicon oils, esters, aldehydes, ketones, aromatic hydrocarbons and aliphatic hydrocarbons over a temperature range extending from −40° C. to 60° C. for a period of time longer than 24 months.

In manufacturing lens systems such as telescope objectives on a mass-production basis, where liquid lens elements are to be contained between glass lens elements, it is necessary to use a mounting technique whereby the glass lens elements can be positioned coaxially with respect to each other with extremely accurate precision, and whereby the liquid (or liquids) comprising the liquid lens elements can be contained within gaps between adjacent glass lens elements without leaking from the gaps.

SUMMARY OF THE INVENTION

It is an object of the present invention to provide a technique for mounting a lens system comprising at least one liquid lens element contained between adjacent rigid (e.g., glass) lens elements in precise coaxial alignment.

It is a more particular object of the present invention to provide a technique for assembling glass lens elements in precise coaxial alignment with each other at specified axial separations from each other, and for confining liquid lens elements in leak-tight containment between adjacent glass lens elements.

In manufacturing a lens system (e.g., a telescope objective) according to the present invention in which liquid lens elements are contained in gaps between adjacent glass lens elements, each of the glass lens elements is adhesively bonded to an interior surface portion of a corresponding cylindrical mounting ring by means of a sealant material that is impervious to the liquid (or liquids) forming the liquid lens elements. The sealant material is a proprietary fluorosilicone compound commercially marketed as "DOW CORNING X5-8738". Compressible O-rings made of VITON ® are positioned between adjoining cylindrical mounting rings to prevent leakage of the liquid lens elements from the gaps between adjacent glass lens elements. Adjoining mounting rings are secured to each other in substantially three-point mounting contact.

DESCRIPTION OF THE DRAWING

FIG. 1 is a perspective view of a telescope objective in which two liquid lens elements are contained between three glass lens elements by a mounting technique in accordance with the present invention.

FIG. 2 is a perspective view in exploded detail of the telescope objective of FIG. 1.

FIG. 3 is a longitudinal cross-sectional view of the telescope objective along line 3—3 of FIG. 1.

FIG. 4 is an enlarged view of a portion of the telescope objective enclosed within line 4—4 of FIG. 3.

BEST MODE OF CARRYING OUT THE INVENTION

FIG. 1 shows a telescope objective 10 comprising three cylindrical mounting rings 11, 12 and 13 (as of stainless steel), which are secured together in precise coaxial alignment. As indicated in exploded view in FIG. 2, a glass lens element 21 is mounted in VITON ® the mounting ring 11, a glass lens element 22 is mounted in the mounting ring 12, and a glass lens element 23 is mounted in the mounting ring 13. Planar end surfaces of the mounting rings 11 and 12 adjoin each other; and an annular groove (not visible in the perspective of FIG. 2 ) is provided on the planar end surface of the mounting ring 11 to receive a compressible O-ring 24. Another planar end surface at the opposite end of the mounting ring 12 adjoins a planar end surface of the mounting ring 13; and an annular groove 25 is provided on the planar end surface of the mounting ring 13 to receive a compressible O-ring 26.

The O-rings 24 and 26 are made of VITON ®, which is a commercially available fluoroelastomeric material. The VITON ® O-rings 24 and 26 are substantially impervious to liquids such as silicon oils, esters, aldehydes, ketones, aromatic hydrocarbons and aliphatic hydrocarbons, which are presently being investigated for use as refractive elements for color-corrected optical systems.

The cylindrical mounting rings 11, 12 and 13 are radially dimensioned to maintain the glass lens elements 21, 22 and 23 in coaxial alignment with each other when the mounting rings 11, 12 and 13 are secured together. Furthermore, the mounting rings 11, 12 and 13 are longitudinally dimensioned to maintain a specified axial spacing between adjacent glass lens elements 21 and 22, and a specified axial spacing between adjacent glass lens elements 22 and 23.

The mounting rings 11 and 12 are secured to each other by fastening screws 31, 32 and 33, which extend longitudinally within corresponding bores through the mounting ring 11 into corresponding screw-threaded holes in the mounting ring 12. Thin metal washers 34, 35 (not visible in the perspective of FIG. 2) and 36 are positioned between adjoining end surfaces of the mounting rings 11 and 12 at the locations of the bores and holes within which the screws 31, 32 and 33, respectively, are received. Similarly, the mounting rings 12 and 13 are secured to each other by fastening screws 41, 42 (not visible in the perspective of FIG. 2) and 43, which extend longitudinally within corresponding bores through the mounting ring 13 into corresponding screw-threaded holes in the mounting ring 12. Thin metal washers 44, 45 (not visible in the perspective of FIG. 2) and 46 are positioned between adjoining end surfaces of the mounting rings 12 and 13 at the locations of the bores and holes within which the screws 41, 42 and 43, respectively, are received.

Attachment of the cylindrical mounting rings 11 and 12 to each other at exactly three locations—i.e., at the locations of the washers 34, 35 and 36—provides three-point mounting contact (also called "kinematic mounting") for the mounting rings 11 and 12 with respect to each other. Similarly, attachment of the cylindrical mounting rings 12 and 13 to each other at exactly three locations—i.e., at the locations of the washers 44, 45 and 46—provides three-point mounting contact for the mounting rings 12 and 13 with respect to each other. Three-point mounting contact provides maximum mechanical stability—and hence maximum precision in coaxial alignment of the glass lens elements 21, 22 and 23.

Tightening of the screws 31, 32 and 33 causes compression of the O-ring 24; and tightening of the screws 41, 42 and 43 causes compression of the O-ring 26. The O-ring 24 in compression forms a liquid-tight seal around a gap between the glass lens elements 21 and 22. Similarly, the O-ring 26 in compression forms a liquid-tight seal around a gap between the glass lens elements 22 and 23. In accordance with conventional manufacturing practice, the O-rings 24 and 26 are compressed to an average annular diameter that is about 90% of the uncompressed annular diameter.

A fill port 50 in the cylindrical mounting ring 12 leads to the gap between the glass lens elements 21 and 22. The fill port 50 enables liquid to be introduced into the gap to form a first liquid lens element. A screw-threaded plug 51 and a fluoroelastomeric VITON® washer 52 provide a liquid-tight seal at the fill port 50. A vent port 53 in the cylindrical mounting ring 12 enables air to be evacuated from the gap between the glass lens elements 21 and 22 as liquid is being introduced into the gap. A screw-threaded plug 54 and a Viton® washer 55 provide a liquid-tight seal at the vent port 53.

Similarly, a fill port 60 in the cylindrical mounting ring 12 leads to the gap between the glass lens elements 22 and 23. The fill port 60 enables liquid to be introduced into the gap to form a second liquid lens element. A screw-threaded plug 61 and a Viton® washer 62 provide a liquid-tight seal at the fill port 60. A vent port 63 in the cylindrical mounting ring 12 enables air to be evacuated from the gap between the glass lens elements 22 and 23 as liquid is being introduced into the gap. A screw-threaded plug 64 and a fluoroelastomeric VITON® washer 65 provide a liquid-tight seal at the vent port 63.

In FIG. 3, the telescope objective 10 is illustrated in longitudinal cross-sectional detail. The glass lens element 21 is seen to be adhesively bonded to a smooth circularly cylindrical interior surface portion of the mounting ring 11 by means of a bead 71 of a sealant material, which covers a circumferential edge of the glass lens element 21. Similarly, the glass lens element 22 is adhesively bonded to a smooth circularly cylindrical interior surface portion of the mounting ring 12 by means of a bead 72 of the same sealant material, which covers a circumferential edge of the glass lens element 22; and the glass lens element 23 is adhesively bonded to a smooth circularly cylindrical interior surface portion of the mounting ring 13 by means of a bead 73 of the same sealant material, which covers a circumferential edge of the glass lens element 23. A suitable sealant material for the beads 71, 72 and 73 is a proprietary fluorosilicone compound marketed by Dow Corning Corporation of Midland, Mich. as "DOW CORNING X5-8738".

A peripheral portion of the glass lens element 21 bears against an inwardly flanged portion of the mounting ring 11, which is precisely machined in order to position the glass lens element 21 so that one surface thereof (i.e., the right-facing surface in the view of FIG. 3) is spaced by a specified axial distance from the planar end surface of the mounting ring 11 that adjoins the left-facing planar end surface of the mounting ring 12. Similarly, a peripheral portion of the glass lens element 22 bears against an inwardly flanged portion of the mounting ring 12, which is precisely machined in order to position the glass lens element 22 so that the left-facing surface thereof is precisely spaced by a specified axial distance from the left-facing planar end surface of the mounting ring 12, and so that the right-facing surface thereof is precisely spaced by a specified axial distance from the right-facing planar end surface of the mounting ring 12. Likewise, a peripheral portion of the glass lens element 23 bears against an inwardly flanged portion of the mounting ring 13, which is precisely machined in order to position the glass lens element 23 so that the left-facing surface thereof is precisely spaced by a specified axial distance from the left-facing planar end surface of the mounting ring 13. In this way, precisely specified axial spacings are maintained between the glass lens elements 21 and 22, and between the glass lens elements 22 and 23.

The inwardly flanged portions of the cylindrical mounting rings 11, 12 and 13 are non-perpendicular with respect to the common axis of the mounting rings 11, 12 and 13 when assembled together (which coincides with the optic axis of the glass lens elements 21, 22 and 23), so that the amount of light that can be reflected paraxially through the telescope objective 10 is minimized. Liquid introduced via the fill port 50 into the gap between the glass lens elements 21 and 22 serves as the first liquid lens element, which is indicated in FIG. 3 by reference number 81. Liquid introduced via the fill port 60 into the gap between the glass lens elements 22 and 23 serves as the second liquid lens element, which is indicated in FIG. 3 by reference number 82.

FIG. 4 shows an enlarged view of the adjoining end surfaces of the cylindrical mounting rings 12 and 13 in the vicinity of the fastening screw 42. The washer 45 is seen in FIG. 4 to provide a "point" of contact between the cylindrical mounting rings 12 and 13. The washers 44 and 46 provide two other "points" of contact, so as to provide substantially three-point mounting contact between the cylindrical mounting rings 12 and 13. A similar view could be shown of the adjoining end surfaces of the cylindrical mounting rings 11 and 12 in the vicinity of each of the fastening screws 34, 35 and 36. As is apparent from FIG. 4, the compressed O-ring 26 prevents the liquid forming the second liquid lens element 82 from leaking out of the gap between the glass lens elements 22 and 23. In a similar manner, the compressed O-ring 24 prevents the liquid forming the first liquid lens element 81 from leaking out of the gap between the glass lens elements 21 and 22.

The present invention has been described above in terms of a particular embodiment. However, practitioners skilled in the art of fabricating optical instruments could, upon perusing the foregoing specification and accompanying drawing, develop modifications of the disclosed embodiment to accommodate special requirements of particular applications. Accordingly, the particular embodiment disclosed herein is to be considered as merely illustrative of the invention, which is defined more generally by the following claims and their equivalents.

I claim:

1. A lens assembly comprising a first rigid lens element, a second rigid lens element, and a first liquid lens element; said first liquid lens element being contained between said first and second rigid lens elements; said lens assembly further comprising:
   a) a first mounting ring, a circumferential surface portion of said first rigid lens element being adhesively bonded to an interior surface portion of said first mounting ring by means of a first bead of sealant material that is substantially impervious to liquid of which said first liquid lens element consists; and
   b) a second mounting ring, a circumferential surface portion of said second rigid lens element being adhesively bonded to an interior surface portion of said second mounting ring by means of a second bead of sealant material that is substantially impervious to liquid of which said first liquid lens element consists;
   said first and second mounting rings being dimensioned to maintain said first and second rigid lens elements in coaxial disposition and at a specified axial spacing with respect to each other when corresponding surface portions of said first and second mounting rings adjoin each other, a gap of predetermined configuration thereby being defined between said first and second rigid lens elements;
   the surface portion of one of said first and second mounting rings adjoining the corresponding surface portion of the other of said first and second mounting rings having a continuous groove, a compressible first sealing ring being received in said groove, said first sealing ring being substantially impervious to said liquid of which said first liquid lens element consists, said first and second mounting rings being securable to each other so as to compress said first sealing ring while maintaining said first and second rigid lens elements in substantially coaxial alignment with each other, said first sealing ring when compressed serving to retain said liquid of which said first liquid lens element consists within said gap between said first and second rigid lens elements;
   one of said first and second mounting rings having a first fill port through which said liquid of which said first liquid lens element consists can be introduced into said gap between said first and second rigid lens elements to form said first liquid lens element, a first plug being receivable in said first fill port to retain said first liquid lens element in said gap between said first and second rigid lens elements.

2. The lens assembly of claim 1 wherein said first and second mounting rings are generally cylindrical; and wherein said first rigid lens element is positioned substantially coaxially with respect to said first mounting ring, and said second rigid lens element is positioned substantially coaxially with respect to said second mounting ring.

3. The lens assembly of claim 1 wherein said first and second beads of sealant material substantially consist of a fluorosilicone material.

4. The lens assembly of claim 3 wherein said sealant material substantially consists of a material marketed as "DOW CORNING X5-8738" material.

5. The lens assembly of claim 1 wherein said continuous groove is annular, and said first sealing ring is an O-ring dimensioned to be received in said groove.

6. The lens assembly of claim 1 wherein said first sealing ring is made of a fluoroelastomeric material.

7. The lens assembly of claim 6 wherein said fluoroelastomeric material consists of a material marketed as "VITON®".

8. The lens assembly of claim 2 wherein said corresponding surface portions of said first and second cylindrical mounting rings are substantially planar and adjoin each other in substantially three-point mounting contact.

9. The lens assembly of claim 8 wherein said first and second cylindrical mounting rings are secured to each other by fasteners attached at said corresponding surface portions of said first and second mounting rings to provide said three-point mounting contact between said first and second mounting rings.

10. The lens assembly of claim 9 wherein said first and second cylindrical mounting rings are secured to each other by means of screws, said screws being received in corresponding longitudinally extending bores at three locations on each of said first and second mounting rings.

11. A lens assembly comprising a first rigid lens element, a second rigid lens element, and a first liquid lens element; said first liquid lens element being contained between said first and second rigid lens elements; said lens assembly further comprising:
   a) a first mounting ring, a circumferential surface portion of said first rigid lens element being adhesively bonded to an interior surface portion of said first mounting ring by means of a first bead of sealant material that is substantially impervious to liquid of which said first liquid lens element consists; and
   b) a second mounting ring, a circumferential surface portion of said second rigid lens element being adhesively bonded to an interior surface portion of said second mounting ring by means of a second bead of sealant material that is substantially impervious to liquid of which said first liquid lens element consists:
   said first and second mounting rings being dimensioned to maintain said first and second rigid lens elements in coaxial disposition and at a specified axial spacing with respect to each other when corresponding surface portions of said first and second mounting rings adjoin each other, a gap of predetermined configuration thereby being defined between said first and second rigid lens elements;

the surface portion of one of said first and second mounting rings adjoining the corresponding surface portion of the other of said first and second mounting rings having a continuous groove, a compressible first sealing ring being received in said groove, said first sealing ring being substantially impervious to said liquid of which said first liquid lens element consists, said first and second mounting rings being securable to each other so as to compress said first sealing ring while maintaining said first and second rigid lens elements in substantially coaxial alignment with each other, said first sealing ring when compressed serving to retain said liquid of which said first liquid lens element consists within said gap between said first and second rigid lens elements;

one of said first and second mounting rings having a first fill port through which said liquid of which said first liquid lens element consists can be introduced into said gap between said first and second rigid lens elements to form said first liquid lens element, a first plug being receivable in said first fill port to retain said first liquid lens element in said gap between said first and second rigid lens elements;

said first and second mounting rings being generally cylindrical; and wherein said first rigid lens element is positioned substantially coaxially with respect to said first mounting ring, and said second rigid lens element is positioned substantially coaxially with respect to said second mounting ring;

said corresponding surface portions of said first and second cylindrical mounting rings are substantially planar and adjoin each other in substantially three-point mounting contact;

said first and second cylindrical mounting rings are secured to each other by fasteners attached at said corresponding surface portions of said first and second mounting rings to provide said three-point mounting contact between said first and second mounting rings;

said first and second cylindrical mounting rings are secured to each other by means of screws, said screws being received in corresponding longitudinally extending bores at three locations on each of said first and second mounting rings; and washers are positioned between said surface portions of said first and second cylindrical mounting rings around corresponding bores at said three locations on each of said first and second mounting rings, said screws passing through corresponding washers to provide said three-point mounting contact between said first and second mounting rings.

12. A lens assembly comprising a first rigid lens element, a second rigid lens element, and a first liquid lens element; said first liquid lens element being contained between said first and second rigid lens elements; said lens assembly further comprising:

a first mounting ring, a circumferential surface portion of said first rigid lens element being adhesively bonded to an interior surface portion of said first mounting ring by means of a first bead of sealant material that is substantially impervious to liquid of which said first liquid lens element consists; and b) a second mounting ring, a circumferential surface portion of said second rigid lens element being adhesively bonded to an interior surface portion of said second mounting ring by means of a second bead of sealant material that is substantially impervious to liquid of which said first liquid lens element consists;

said first and second mounting rings being dimensioned to maintain said first and second rigid lens elements in coaxial disposition and at a specified axial spacing with respect to each other when corresponding surface portions of said first and second mounting rings adjoin each other, a gap of predetermined configuration thereby being defined between said first and second rigid lens elements;

the surface portion of one of said first and second mounting rings adjoining the corresponding surface portion of the other of said first and second mounting rings having a continuous groove, a compressible first sealing ring being received in said groove, said first sealing ring being substantially impervious to said liquid of which said first liquid lens element consists, said first and second mounting rings being securable to each other so as to compress said first sealing ring while maintaining said first and second rigid lens elements in substantially coaxial alignment with each other, said first sealing ring when compressed serving to retain said liquid of which said first liquid lens element consists within said gap between said first and second rigid lens elements;

one of said first and second mounting rings having a first fill port through which said liquid of which said first liquid lens element consists can be introduced into said gap between said first and second rigid lens elements to form said first liquid lens element, a first plug being receivable in said first fill port to retain said first liquid lens element in said gap between said first and second rigid lens elements;

wherein one of said first and second mounting rings has a first vent port through which air can be evacuated from said gap between said first and second rigid lens elements as said liquid is being introduced into said gap through said first fill port to form said first liquid lens element, a second plug being receivable in said first vent port to retain said first liquid lens element in said gap between said first and second rigid lens elements.

13. The lens assembly of claim 1 wherein said groove in which said compressible first sealing ring is received is formed in said adjoining surface portion of said first mounting ring; and wherein said first fill port for introducing said liquid of which said first liquid lens element consists is formed in said second mounting ring.

14. A lens assembly comprising a first rigid lens element, a second rigid lens element, and a first liquid lens element; said first liquid lens element being contained between said first and second rigid lens elements; said lens assembly further comprising:

a) a first mounting ring, a circumferential surface portion of said first rigid lens element being adhesively bonded to an interior surface portion of said first mounting ring by means of a first bead of sealant material that is substantially impervious to liquid of which said first liquid lens element consists; and b) a second mounting ring, a circumferential surface portion of said second rigid lens element being adhesively bonded to an interior surface portion of said second mounting ring by means of a second bead of sealant material that is substantially impervious to liquid of which said first liquid lens element consists;

said first and second mounting rings being dimensioned to maintain said first and second rigid lens elements in coaxial disposition and at a specified axial spacing with respect to each other when corresponding surface portions of said first and second mounting rings adjoin each other, a gap of predetermined configuration thereby being defined between said first and second rigid lens elements;

the surface portion of one of said first and second mounting rings adjoining the corresponding surface portion of the other of said first and second mounting rings having a continuous groove, a compressible first sealing ring being received in said groove, said first sealing ring being substantially impervious to said liquid of which said first liquid lens element consists, said first and second mounting rings being securable to each other so as to compress said first sealing ring while maintaining said first and second rigid lens elements in substantially coaxial alignment with each other, said first sealing ring when compressed serving to retain said liquid of which said first liquid lens element consists within said gap between said first and second rigid lens elements;

one of said first and second mounting rings having a first fill port through which said liquid of which said first liquid lens element consists can be introduced into said gap between said first and second rigid lens elements to form said first liquid lens element, a first plug being receivable in said first fill port to retain said first liquid lens element in said gap between said first and second rigid lens elements;

said groove in which said compressible first sealing ring is received is formed in said adjoining surface portion of said first mounting ring; and wherein said first fill port for introducing said liquid of which said first liquid lens element consists is formed in said second mounting ring;

wherein a first vent port is formed in said second mounting ring, said first vent port permitting air to be evacuated from said gap between said first and second rigid lens elements as said liquid is being introduced through said first fill port to form said first liquid lens element, a second plug being receivable in said first vent port to retain said first liquid lens element in said gap between said first and second rigid lens elements.

15. The lens assembly of claim 2 further comprising a third rigid lens element and a second liquid lens element, a circumferential surface portion of said third rigid lens element being adhesively bonded to an interior surface portion of a third cylindrical mounting ring by means of third bead of sealant material that is substantially impervious to liquid of which said second liquid lens element consists;

said second and third cylindrical mounting rings being axially dimensioned to maintain said second and third rigid lens elements at a specified axial spacing with respect to each other when corresponding surface portions of said second and third cylindrical mounting rings adjoin each other, a gap of predetermined configuration thereby being defined between said second and third rigid lens elements;

an annular groove being formed in the surface portion of one of said second and third cylindrical mounting rings adjoining the corresponding surface portion of the other of said second and third cylindrical mounting rings, a compressible second sealing ring being received in said annular groove, said second sealing ring being substantially impervious to liquid of which said second liquid lens element consists, said second and third cylindrical mounting rings being securable to each other so as to compress said second sealing ring while maintaining said second and third rigid lens elements in substantially coaxial alignment with each other, said second sealing ring when compressed serving to retain said liquid of which said second liquid lens element consists within said gap between said second and third rigid lens elements;

one of said second and third cylindrical mounting rings having a second fill port through which said liquid of which said second liquid lens element consists can be introduced into said gap between said second and third rigid lens elements to form said second liquid lens element, a third plug being receivable in said second fill port to retain said second liquid lens element in said gap between said second and third rigid lens elements.

16. A lens assembly comprising a first rigid lens element, a second rigid lens element, and a first liquid lens element; said first liquid lens element being contained between said first and second rigid lens elements; said lens assembly further comprising:

a) a first mounting ring, a circumferential surface portion of said first rigid lens element being adhesively bonded to an interior surface portion of said first mounting ring by means of a first bead of sealant material that is substantially impervious to liquid of which said first liquid lens element consists; and b) a second mounting ring, a circumferential surface portion of said second rigid lens element being adhesively bonded to an interior surface portion of said second mounting ring by means of a second bead of sealant material that is substantially impervious to liquid of which said first liquid lens element consists;

said first and second mounting rings being dimensioned to maintain said first and second rigid lens elements in coaxial disposition and at a specified axial spacing with respect to each other when corresponding surface portions of said first and second mounting rings adjoin each other, a gap of predetermined configuration thereby being defined between said first and second rigid lens elements;

the surface portion of one of said first and second mounting rings adjoining the corresponding surface portion of the other of said first and second mounting rings having a continuous groove, a compressible first sealing ring being received in said groove, said first sealing ring being substantially impervious to said liquid of which said first liquid lens element consists, said first and second mounting rings being securable to each other so as to compress said first sealing ring while maintaining said first and second rigid lens elements in substantially coaxial alignment with each other, said first sealing ring when compressed serving to retain said liquid of which said first liquid lens element consists within said gap between said first and second rigid lens elements;

one of said first and second mounting rings having a first fill port through which said liquid of which said first liquid lens element consists can be introduced into said gap between said first and second rigid lens elements to form said first liquid lens element, a first plug being receivable in said first fill port to retain said first liquid lens element in said gap between said first and second rigid lens elements;

said first and second mounting rings being generally cylindrical; and wherein said first rigid lens element is positioned substantially coaxially with respect to said first mounting ring, and said second rigid lens element is positioned substantially coaxially with respect to said second mounting ring;

a third rigid lens element and a second liquid lens element, a circumferential surface portion of said third rigid lens element being adhesively, bonded to an interior surface portion of a third cylindrical mounting ring by means of a third bead of sealant material that is substantially impervious to liquid of which said second liquid lens element consists;

said second and third cylindrical mounting rings being axially dimensioned to maintain said second and third rigid lens elements at a specified axial spacing with respect to each other when corresponding surface portions of said second and third cylindrical mounting rings adjoin each other, a gap of predetermined configuration thereby being defined between said second and third rigid lens elements;

an annular groove being formed in the surface portion of one of said second and third cylindrical mounting rings adjoining the corresponding surface portion of the other of said second and third cylindrical mounting rings, a compressible second sealing ring being received in said annular groove, said second sealing ring being substantially impervious to liquid of which said second liquid lens element consists, said second and third cylindrical mounting rings being securable to each other so as to compress said second sealing ring while maintaining said second and third rigid lens elements in substantially coaxial alignment with each other, said second sealing ring when compressed serving to retain said liquid of which said second liquid lens element consists within said gap between said second and third rigid lens elements;

one of said second and third cylindrical mounting rings having a second fill port through which said liquid of which said second liquid lens element consists can be introduced into said gap between said second and third rigid lens elements to form said second liquid lens element, a third plug being receivable in said second fill port to retain said second liquid lens element in said gap between said second and third rigid lens elements;

wherein said third bead of sealant material substantially consists of a fluorosilicone material.

17. The lens assembly of claim 15 wherein said first, second and third beads of sealant material substantially consist of the same material.

18. The lens assembly of claim 15 wherein said first and second sealing rings are O-rings.

19. The lens assembly of claim 15 wherein said second sealing ring is made of substantially the same material as said first sealing ring.

20. The lens assembly of claim 15 wherein said corresponding surface portions of said second and third cylindrical mounting rings are substantially planar and adjoin each other in substantially three-point mounting contact.

21. The lens assembly of claim 20 wherein said second and third cylindrical mounting rings are secured to each other by fasteners attached at said corresponding surface portions of said second and third cylindrical mounting rings to provide three-point mounting contact between said second and third cylindrical mounting rings.

22. The lens assembly of claim 21 wherein said second and third cylindrical mounting rings are secured to each other by means of screws, said screws being received in corresponding longitudinally extending bores at three locations on each of said second and third cylindrical mounting rings.

23. A lens assembly comprising a first rigid lens element, a second rigid lens element, and a first liquid lens element; said first liquid lens element being contained between said first and second rigid lens elements; said lens assembly further comprising:

a) a first mounting ring, a circumferential surface portion of said first rigid lens element being adhesively bonded to an interior surface portion of said first mounting ring by means of a first bead of sealant material that is substantially impervious to liquid of which said first liquid lens element consists; and b) a second mounting ring, a circumferential surface portion of said second rigid lens element being adhesively bonded to an interior surface portion of said second mounting ring by means of a second bead of sealant material that is substantially impervious to liquid of which said first liquid lens element consists;

said first and second mounting rings being dimensioned to maintain said first and second rigid lens elements in coaxial disposition and at a specified axial spacing with respect to each other when corresponding surface portions of said first and second mounting rings adjoin each other, a gap of predetermined configuration thereby being defined between said first and second rigid lens elements;

the surface portion of one of said first and second mounting rings adjoining the corresponding surface portion of the other of said first and second mounting rings having a continuous groove, a compressible first sealing ring being received in said groove, said first sealing ring being substantially impervious to said liquid of which said first liquid lens element consists, said first and second mounting rings being securable to each other so as to compress said first sealing ring while maintaining said first and second rigid lens elements in substantially coaxial alignment with each other, said first sealing ring when compressed serving to retain said liquid of which said first liquid lens element consists within said gap between said first and second rigid lens elements;

one of said first and second mounting rings having a first fill port through which said liquid of which said first liquid lens element consists can be introduced into said gap between said first and second rigid lens elements to form said first liquid lens element, a first plug being receivable in said first fill port to retain said first liquid lens element in said gap between said first and second rigid lens elements;

said first and second mounting rings being generally cylindrical; and wherein said first rigid lens element is positioned substantially coaxially with respect to said first mounting ring, and said second rigid lens element is positioned substantially coaxially with respect to said second mounting ring;

a third rigid lens element and a second liquid lens element, a circumferential surface portion of said third rigid lens element is adhesively bonded to an interior surface portion of a third cylindrical mounting ring by means of a third bead of sealant material that is substantially impervious to liquid of which said second liquid lens element consists;

said corresponding surface portions of said second and third cylindrical mounting rings are substantially planar and adjoin each other in substantially three-point mounting contact;

said second and third cylindrical mounting tings are secured to each other by fasteners attached at said corresponding surface portions of said second and third cylindrical mounting rings to provide three-point mounting contact between said second and third cylindrical mounting rings;

said second and third cylindrical mounting rings are secured to each other by means of screws, said screws being received in corresponding longitudinally extending bores at three locations on each of said second and third cylindrical mounting rings; and washers are positioned between said corresponding surface portions of said second and third cylindrical mounting rings around corresponding bores at said three locations on each of said second and third cylindrical mounting rings, said screws passing through corresponding washers to provide said three-point mounting contact between said second and third cylindrical mounting rings.

24. A lens assembly comprising a first rigid lens element, a second rigid lens element, and a first liquid lens element; said first liquid lens element being contained between said first and second rigid lens elements; said lens assembly further comprising:

a) a first mounting ring, a circumferential surface portion of said first rigid lens element being adhesively bonded to an interior surface portion of said first mounting ring by means of a first bead of sealant material that is substantially impervious to liquid of which said first liquid lens element consists; and b) a second mounting ring, a circumferential surface portion of said second rigid lens element being adhesively bonded to an interior surface portion of said second mounting ring by means of a second bead of sealant material that is substantially impervious to liquid of which said first liquid lens element consists;

said first and second mounting rings being dimensioned to maintain said first and second rigid lens elements in coaxial disposition and at a specified axial spacing with respect to each other when corresponding surface portions of said first and second mounting rings adjoin each other, a gap of predetermined configuration thereby being defined between said first and second rigid lens elements;

the surface portion of one of said first and second mounting rings adjoining the corresponding surface portion of the other of said first and second mounting rings having a continuous groove, a compressible first sealing ring being received in said groove, said first sealing ring being substantially impervious to said liquid of which said first liquid lens element consists, said first and second mounting rings being securable to each other so as to compress said first sealing ring while maintaining said first and second rigid lens elements in substantially coaxial alignment with each other, said first sealing ring when compressed serving to retain said liquid of which said first liquid lens element consists within said gap between said first and second rigid lens elements;

one of said first and second mounting rings having a first fill port through which said liquid of which said first liquid lens element consists can be introduced into said gap between said first and second rigid lens elements to form said first liquid lens element, a first plug being receivable in said first fill port to retain said first liquid lens element in said gap between said first and second rigid lens elements;

said first and second mounting rings being generally cylindrical; and wherein said first rigid lens element is positioned substantially coaxially with respect to said first mounting ring, and said second rigid lens element is positioned substantially coaxially with respect to said second mounting ring;

a third rigid lens element and a second liquid lens element, a circumferential surface portion of said third rigid lens element is adhesively bonded to an interior surface portion of a third cylindrical mounting ring by means of a third bead of sealant material that is substantially impervious to liquid of which said second liquid lens element consists;

said second and third cylindrical mounting rings are axially dimensioned to maintain said second and third rigid lens elements at a specified axial spacing with respect to each other when corresponding surface portions of said second and third cylindrical mounting rings adjoin each other, a gap of predetermined configuration thereby being defined between said second and third rigid lens elements;

an annular is formed in the surface portion of one of said second and third cylindrical mounting rings adjoining the corresponding surface portion of the other of said second and third cylindrical mounting rings, a compressible second sealing ring being received in said annular groove, said second sealing ring being substantially impervious to liquid of which said second liquid lens element consists, said second and third cylindrical mounting rings being securable to each other so as to compress said second sealing ring while maintaining said second and third rigid lens elements in substantially coaxial alignment with each other, said second sealing ring when compressed serving to retain said liquid of which said second liquid lens element consists within said gap between said second and third rigid lens elements;

one of said second and third cylindrical mounting rings having a second fill port through which said liquid of which said second liquid lens element consists can be introduced into said gap between said second and third rigid lens elements to form said second liquid lens element, a third plug being receivable in said second fill port to retain said second liquid lens element in said gap between said second and third rigid lens elements; and one of said second and third cylindrical mounting rings has a second vent port through which air can be evacuated from said gap between said second and third rigid lens elements as said liquid is being introduced into said gap through said second fill port to form said second liquid lens element, a fourth plug being receivable in said second vent port to retain said second liquid lens element in said gap between said second and third rigid lens elements.

25. The lens assembly of claim 15 wherein said annular groove in which said compressible second sealing ring is received is formed in said adjoining surface portion of said third cylindrical mounting ring; and wherein said second fill port for introducing said liquid of which said second liquid lens element consists is formed in said second cylindrical mounting ring.

26. A lens assembly comprising a first rigid lens element, a second rigid lens element, and a first liquid lens element; said first liquid lens element being contained between said first and second rigid lens elements; said lens assembly further comprising:

a) a first mounting ring, a circumferential surface portion of said first rigid lens element being adhesively bonded to an interior surface portion of said first mounting ring by means of a first bead of sealant material that is substantially impervious to liquid of which said first liquid lens element consists; and b) a second mounting ring, a circumferential surface portion of said second rigid lens element being adhesively bonded to an interior surface portion of said second mounting ring by means of a second bead of sealant material that is substantially impervious to liquid of which said first liquid lens element consists;

said first and second mounting rings being dimensioned to maintain said first and second rigid lens elements in coaxial disposition and at a specified axial spacing with respect to each other when corresponding surface portions of said first and second mounting rings adjoin each other, a gap of predetermined configuration thereby being defined between said first and second rigid lens elements;

the surface portion of one of said first and second mounting rings adjoining the corresponding surface portion of the other of said first and second mounting rings having a continuous groove, a compressible first sealing ring being received in said groove, said first sealing ring being substantially impervious to said liquid of which said first liquid lens element consists, said first and second mounting rings being securable to each other so as to compress said first sealing ring while maintaining said first and second rigid lens elements in substantially coaxial alignment with each other, said first sealing ring when compressed serving to retain said liquid of which said first liquid lens element consists within said gap between said first and second rigid lens elements;

one of said first and second mounting rings having a first fill port through which said liquid of which said first liquid lens element consists can be introduced into said gap between said first and second rigid lens elements to form said first liquid lens element, a first plug being receivable in said first fill port to retain said first liquid lens element in said gap between said first and second rigid lens elements;

said first and second mounting rings being generally cylindrical; and wherein said first rigid lens element is positioned substantially coaxially with respect to said first mounting ring, and said second rigid lens element is positioned substantially coaxially with respect to said second mounting ring ;

a third rigid lens element and a second liquid lens element, a circumferential surface portion of said third rigid lens element being adhesively bonded to an interior surface portion of a third cylindrical mounting ring by means of a third bead of sealant material that is substantially impervious to liquid of which said second liquid lens element consists;

said second and third cylindrical mounting rings being axially dimensioned to maintain said second and third rigid lens elements at a specified axial spacing with respect to each other when corresponding surface portions of said second and third cylindrical mounting rings adjoin each other, a gap of predetermined configuration thereby being defined between said second and third rigid lens elements an annular groove being formed in the surface portion of one of said second and third cylindrical mounting rings adjoining the corresponding surface portion of the other of said second and third cylindrical mounting rings, a compressible second sealing ring being received in said annular groove, said second sealing ring being substantially impervious to liquid of which said second liquid lens element consists, said second and third cylindrical mounting rings being securable to each other so as to compress said second sealing ring while maintaining said second and third rigid lens elements in substantially coaxial alignment with each other, said second sealing ring when compressed serving to retain said liquid of which said second liquid lens element consists within said gap between said second and third rigid lens elements;

one of said second and third cylindrical mounting rings having a second fill port through which said liquid of which said second liquid lens element consists can be introduced into said gap between said second and third rigid lens elements to form said second liquid lens element, a third plug being receivable in said second fill port to retain said second liquid lens element in said gap between said second and third rigid lens elements;

said annular groove in which said compressible second sealing ring is received is formed in said adjoining surface portion of said third cylindrical mounting ring; wherein said second fill port for introducing said liquid of which said second liquid lens element consists is formed in said second cylindrical mounting ring; and a second vent port is formed in said second cylindrical mounting ring, said second vent port permitting air to be evacuated from said gap between said second and third rigid lens elements as said liquid is being introduced through said fill port to form said second liquid lens element, a fourth plug being receivable in said second vent port to retain said second liquid lens element in said gap between said second and third rigid lens elements.

27. A method for assembling a lens assembly with a liquid optical element, said method including the steps of:
   a) forming a first lens segment by mounting a first rigid lens element onto a first mounting ring by attaching said first rigid lens element with a fluorosilicone compound to a first circumferential surface of said first mounting ring having a first planar end surface;
   b) forming a second lens segment by mounting a second rigid lens element onto a second mounting ring by attaching said second lens element with a flexible sealant material to a second circumferential surface of said second mounting ring having a second planar end surface;
   c) sealing a cavity between said first and second lens segments by securing said first and second mounting rings together while compressing a seal between said first and second planar end surfaces; and
   d) forming said liquid optical element by filling said cavity with a liquid, either before or after sealing said cavity.

28. A method as in claim 27, step (b) further comprising the step of applying a fluorosilicone compound between said second circumferential surface and said second rigid lens element.

29. A method as in claim 27, step (c) further comprising the step of inserting said seal into a single circumferential groove which is located on said first planar end surface.

30. A method as in claim 27, step (c) further comprising the step of forming said seal with a fluoroelastomeric compound.

31. A method as in claim 27, step (c) further comprising the step of securing said first and second mounting rings in at least three locations.

32. A method for assembling a lens assembly with a first and a second liquid optical element, said method including the steps of:
   a) bonding
      i) a first rigid lens element onto a circumferential surface of a first mounting ring by applying a fluorosilicon compound,
      ii) a second rigid lens element onto a circumferential surface of a second mounting ring by applying a fluorosilicone compound, and
      iii) a third rigid lens element onto a circumferential surface of a third mounting ring by applying a fluorosilicone compound;
   b) Sealing a first cavity between said first and second rigid lenses, and, a second cavity between said second and third rigid lenses by
      i) inserting a fluoroelastomeric seal into a circumferential groove on a first planar end surface of each of said first and third mounting rings;
      ii) securing together each of said first and third mounting rings with said second mounting ring while compressing said seal between said first planar end surface of each of said first and third mounting rings, and a second planar end surface on said second mounting ring where said second planar end surface faces said first planar end surface; and
   c) forming said first and second liquid optical elements by filling, respectively said first and second cavities with a liquid, either before or after sealing said first and second cavities.

33. A method for assembling a lens assembly with a first and a second liquid optical element said method including the steps:
   a) bonding
      i) a first rigid lens element onto a circumferential surface of a first mounting ring by a applying a fluorosilicone compound,
      ii) a second rigid lens element onto a circumferential surface of a second mounting ring by applying a fluorosilicone compound;
      iii) a third rigid lens element onto a circumferential surface of a third mounting ring by applying a fluorosilicone compound, and
   b) Sealing a first cavity between said first and second rigid lenses, and, a second cavity between said second and third rigid lenses by
      i) inserting a fluoroelastomeric seal into a circumferential groove on a first planar end surface of each of said first and third mounting rings;
      ii) securing together each of said first and third mounting rings with said second mounting ring while compressing said seal between said first planar end surface of each of said first and third mounting rings, and a second planar end surface on said second mounting ring where said second planar end surface faces said first planar end surface;
      iii) inserting respective sets of screws through circumferentially located openings extending through said first planar end surfaces; and mating said screws with corresponding female openings extending into said second planar end surfaces, and
   c) forming said first and second liquid optical elements by filling, respectively, said first and second cavities with a liquid, either before or after sealing said first and second cavities.

34. A method for assembling a lens assembly with a first and a second liquid optical element, said method including the steps of:
   a) bonding
      i) a first rigid lens element onto a circumferential surface of a first mounting ring by applying a fluorosilicone compound,
      ii) a second rigid lens element onto a circumferential surface of a second mounting ring by applying a fluorosilicone compound, and
      iii) a third rigid lens element onto a circumferential surface of a third mounting ring by applying a fluorosilicone compound;
   b) Sealing a first cavity between said first and second rigid lenses, and, a second cavity between said, second and third rigid lenses by
      i) inserting a fluoroelastomeric seal into a circumferential groove on a first planar end surface of each of said first and third mounting rings;
      ii) securing together each of said first and third mounting rings with said second mounting ring while compressing said seal between said first planar end surface of each of said first and third mounting rings, and a second planar end surface on said second mounting ring where said second planar end surface faces said first planar end surface; and c) forming said first and second liquid optical elements filling, respectively, said first and second cavities through openings extending radially from an outer radius of one or more of said mounting rings, with a liquid, and sealing said openings with mating caps either before or after sealing said first and second cavities.

* * * * *